United States Patent [19]
Gordon et al.

[11] 3,968,854
[45] July 13, 1976

[54] LOW NOISE LEVEL MUFFLER FOR SMALL ENGINES

[75] Inventors: Douglas Gordon, Hartford; Richard W. Seilenbinder, Milwaukee, both of Wis.

[73] Assignee: Briggs & Stratton Corporation, Wauwatosa, Wis.

[22] Filed: Mar. 18, 1975

[21] Appl. No.: 559,567

[52] U.S. Cl............................... 181/40; 180/54 A; 181/53
[51] Int. Cl.² ........................................ F01N 7/10
[58] Field of Search................ 180/54 A; 181/33 K, 181/36 R, 40, 49, 53, 54, 57, 61

[56] References Cited
UNITED STATES PATENTS

| | | | |
|---|---|---|---|
| 2,667,940 | 2/1954 | Gallihugh............................ | 181/49 |
| 3,497,031 | 2/1970 | Kedziora............................ | 181/40 X |
| 3,590,947 | 7/1971 | Latch et al............................ | 181/53 |
| 3,650,354 | 3/1972 | Gordon.................................. | 181/40 |
| 3,773,127 | 11/1973 | Aaen et al. .................... | 180/54 A X |
| 3,863,734 | 2/1975 | Pawlina............................. | 181/57 X |

*Primary Examiner*—Lawrence R. Franklin

[57] ABSTRACT

Complementary dished members cooperate to define an elongated shell that is divided into front and rear compartments by a partition wall. A U-shaped stamping divides the rear compartment into three aligned and communicated chambers and reinforces the rear shell wall. Gas enters an end one of the chambers through a perforated inlet tube that extends through the rear shell wall, thence flows successively through the other two chambers and into the front compartment. The inlet tube, the U-shaped stamping and the partition wall are so apertured that in the course of such flow the gas is alternately dispersed and recombined. The front compartment is longitudinally divided into two elongated passages through which gas flows lengthwise, in succession, in passing to an outlet in the front shell wall.

8 Claims, 4 Drawing Figures

LOW NOISE LEVEL MUFFLER FOR SMALL ENGINES

This invention relates to mufflers for internal combustion engines, and is more particularly concerned with a muffler for achieving a very low level of exhaust noise in a small engine of the type used for powering garden tractors, lawn mowers and similar machines.

The general object of the present invention is to provide a muffler for single cylinder internal combustion engines that achieves an optimum reduction in the exhaust noise output of the engine without undue sacrifice of engine efficiency, and which is also very compact and low in cost.

It has long been known that, other things being equal, the exhaust silencing of an internal combustion engine is accomplished at the sacrifice of efficiency, and that the greater the silencing effect produced by a muffler, the more of the engine horsepower it can be expected to consume. To the extent that this relationship exists, engine silencing is obtained at the expense of greater engine size and cost and at the sacrifice of fuel economy.

It has also been known that the relationship between noise level and engine efficiency can be improved in some measure by increasing the size of the muffler. However, it is not feasible to increase muffler size to the point where both noise output and power loss become negligible, for the muffler would then be about as big as the engine itself and would be unduly expensive in addition to being prohibitively bulky and unwieldy. Thus the design of a muffler has always involved a weighing and balancing of considerations of size, cost, fuel consumption and silencing effectiveness; and heretofore an improvement in any one of these parameters has usually been obtained at the expense of some loss in one or more of the others.

However, the present invention has as another of its objects the provision of a muffler which is particularly suited for small internal combustion engines and which achieves an improved relationship between silencing effect, engine efficiency, and both size and cost of the muffler.

In recent years there has been an insistent public demand for the silencing of machines powered by small engines. As one result of that demand, certain legislation has been enacted by which the maximum noise output of such machines is required to be lower than the level heretofore regarded as compatible with reasonable fuel economy and muffler cost. Furthermore, such legislation becomes effective at a time when both energy conservation and the avoidance of price increases are matters of intense public concern.

It should be pointed out, however, that the small engine industry has had a longstanding concern with the complex of problems involved in muffler design. Research and innovation in this area were being actively pursued long before there was any widespread public expression of a desire for noise abatement or energy conservation. Prior patents on mufflers for small engines reflect this continuing effort and also demonstrate that more than mere skill is required to achieve even small advances in the art. Hence compliance with the new anti-noise legislation, if it is not to involve undue energy waste or a substantial increase in the cost of equipment, can only be achieved by means of expedients which have not heretofore been obvious even in a well developed art.

Thus another object of the present invention is to provide a muffler that enables the engine which powers a garden tractor, lawn mower or similar machine to operate quietly enough so that the machine as a whole can conform to the most stringent applicable noise control legislation now in effect, without, however, entailing objectionable sacrifices of engine performance, fuel economy, or muffler size or cost.

In furtherance of its objective of enabling the above mentioned anti-noise legislation to be met without undue sacrifice of other desirable characteristics, this invention has, as another and more specific objective, the provision of a muffler which can be conveniently mounted on an out-of-the-way part of a machine powered by an engine on which the muffler is installed, and which muffler also provides for control of the direction in which exhaust gases are emitted.

The extent to which the invention attains its objectives is evident from the fact that a muffler embodying the principles of this invention, intended for 8- through 16- hp engines, can have a largest dimension (length) of 10 inches and can bring exhaust noise of a 10- hp engine on which it is installed to a "direct out" level of 68 dbA at 50 ft., tested at wide-open throttle, while power decreases (as compared with a prior conventional muffler) is about 2% on an 8- hp engine, 4% on a 10- hp engine and 9% on 16- hp engine, all at rated load and speed.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims. The accompanying drawings illustrate one complete example of an embodiment of the invention constructed according to the best mode so far devised for the practical application of the principles thereof, and in which:

Figure 1:
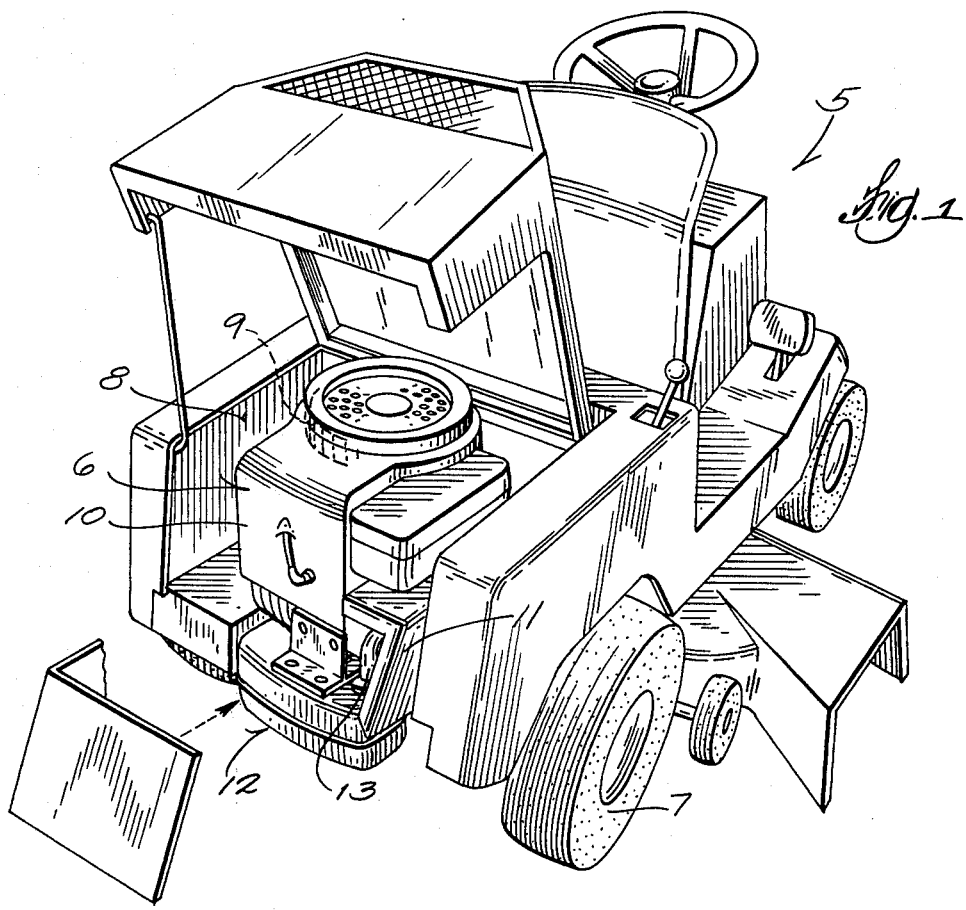
FIG. 1 is a rear perspective view of a riding mower powered by an engine equipped with a muffler embodying the principles of this invention.
Figure 2:
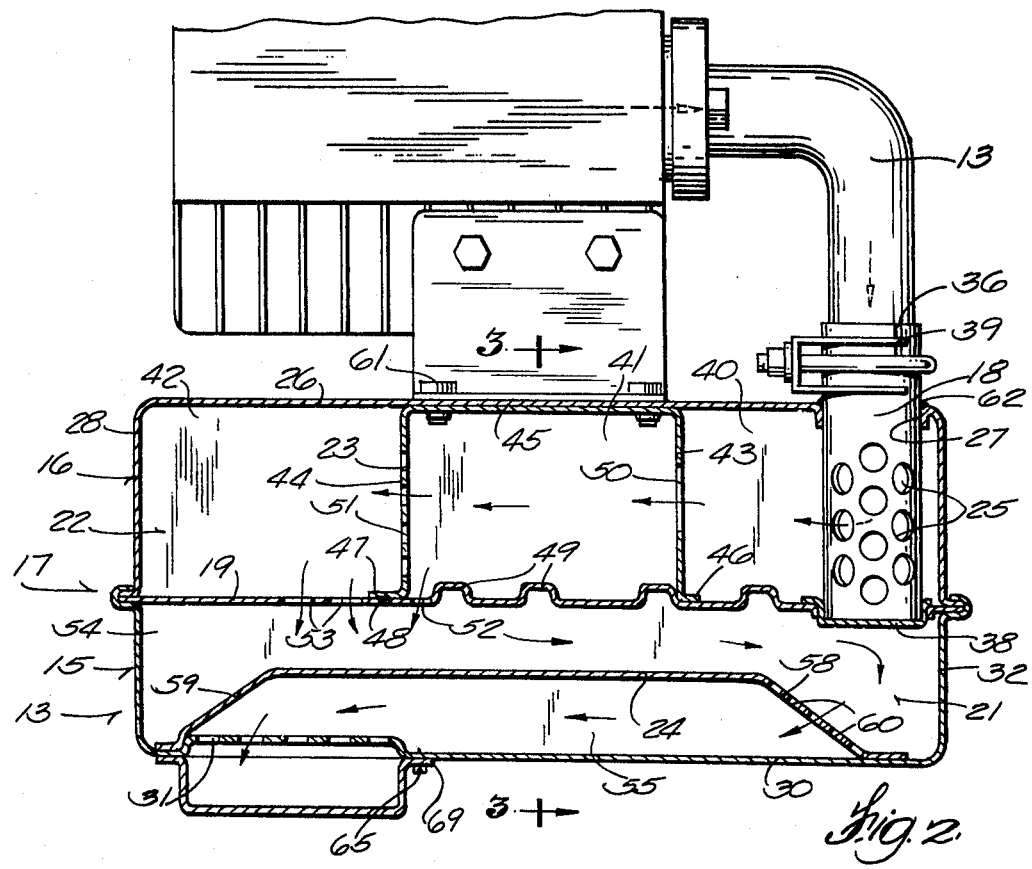
FIG. 2 is a view of the muffler and a part of the engine to which it is connected, the muffler being shown in longitudinal section on its plane of symmetry.
Figure 3:
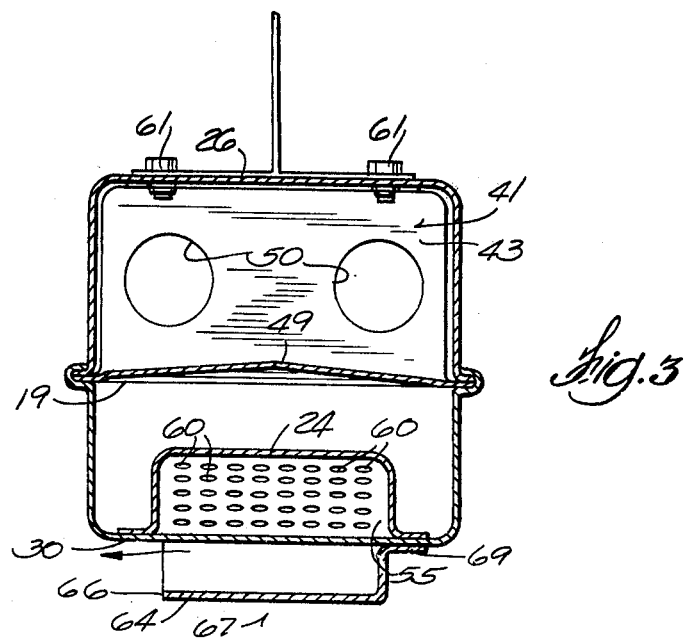
FIG. 3 is a sectonal view of the muffler, taken on the plane of the line 3—3 in FIG. 2.
Figure 4:
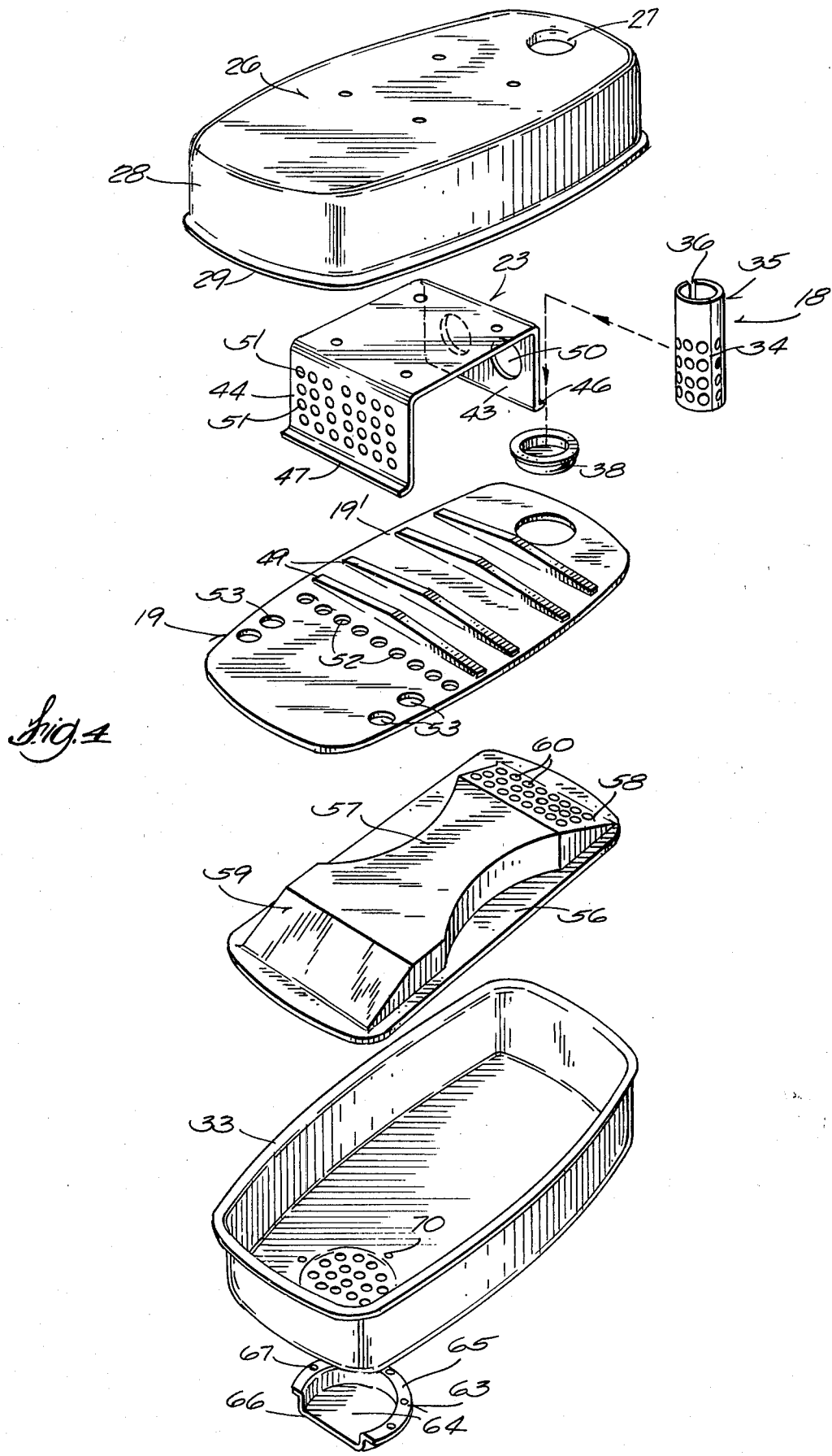
FIG. 4 is an exploded perspective view of the muffler.

Referring now more particularly to the accompanying drawings, the numeral 5 designates generally a riding-type power lawn mower, typical of machines powered by engines to which the muffler of the present invention is applicable. In this case a single-cylinder vertical-crankshaft gasoline engine 6 is mounted at the rear of the machine, over its driven rear wheels 7. The engine 6 is housed in an enclosure 8 of the general type disclosed in Gordon U.S. Pat. No. 3,796,277, which enclosure serves to absorb a substantial part of the noise that is propagated by the engine body itself.

As illustrated, the engine has a conventional flywheel blower 9 mounted on the upper end of ite vertical crankshaft, for blowing cooling air downwardly across the engine cylinder. The flow of such air is guided by means of a conventonal sheet metal shroud 10 which embraces the cylinder and which has in its top an air inlet opening, directly above the blower 9. At its bottom rear, the shroud communicates with an air outlet duct 11 that extends downwardly between the rear wheels 7 of the machine. The air outlet duct is somewhat wider than the shroud 10 so that it can embrace an exhaust pipe 13 that projects from one side of the engine near the bottom of the shroud 10. The muffler of this invention, which is designated generally by 12, is mounted in this air outlet duct, at a level just below the cylinder, so that all of the cooling air that has swept across the engine is constrained to flow across the muffler in the course of its flow to the outlet of the duct.

As compared to the ambient air, the cooling air reaching the muffler is of course relatively hot, being at a temperature on the order of 180°F.; but by comparison with the muffler, which is at a temperature on the order of 1200°F., that air is relatively cool; and because it flows in a steady stream all during engine operation, the expelled cooling air is very effective to cool the muffler.

Thus the objectives of the present invention are in attained by so arranging the muffler as to provide for a substantial transfer of heat from the exhaust gases that flow through muffler to the cooling air that flows out of the duct 11. Such cooling of the exhaust gases has the combined advantages of reducing exhaust noise and of reducing gas pressure in the muffler and thereby reducing the amount of power that the muffler takes from the engine. Installing the muffler in the cooling air outlet duct 11 has the incidental but important safety advantage of preventing anyone from coming into contact with its hot surfaces.

To enable the muffler to be mounted in the cooling air outlet duct, it must be communicated with the exhaust outlet in the engine body by means of a relatively long exhaust pipe 13 that has a right angle bend. As mentioned above, the exhaust pipe is within the air outlet duct so that it, too, is swept by engine cooling air. Heretofore the muffler for a small engine has usually been cantilevered on the outer end of a short exhaust pipe. That mounting arrangement was feasible because of the relatively short length of the exhaust pipe and the relatively small size and weight of the muffler. In the present case, however, the length of the exhaust pipe and the size and weight of the muffler are somewhat too great to permit such cantilevered mounting, and the muffler is therefore supported on a bracket 14 which is secured to the engine cylinder head.

Turning now to a consideration of the muffler itself, it comprises front and rear complementary dished shell members 15 and 16, respectively, which together define an elongated shell 17; a tubular inlet member 18 that is connectable with the exhaust pipe of an engine; a partition member 19 that divides the interior of the shell into communicated front and rear compartments 21 and 22; baffling and reinforcing means, designated generally by 23, which divides the rear compartment 22 into several communicated chambers; and a pan-like baffle member 24 that divides the front compartment 21 into two elongated passages. As the description proceeds, it will be apparent that all of these parts can be readily formed as stampings.

The rear shell member 16 has a flat, elongated and generally rectangular end wall 26 that has in it a port 27 near one end thereof. Through that port extends the tubular inlet member 18, as described below. Extending entirely around the end wall 26 and projecting forwardly from it is an integral side wall 28 which terminates at its front in an out-turned flange-like rim 29 that lies in a plane parallel to the end wall 26.

In like manner the front shell member 15 has a flat, rectangular end wall 30 in which there is a port 31. A rearwardly projecting side wall 32 extends around the front end wall 30 and terminates at its rear in an out-turned rim 33 that lies in a plane parallel to the front end wall 30.

The rims 29 and 33 of the two shell members flatwise oppose one another, and one of them can be somewhat wider than the other to be clinched around the latter for holding the shell members assembled. The partition member 19, which is substantially flat, has its marginal edge portions confined between the opposing rim portions 29 and 33 and is thus secured in place, parallel to the front and rear end walls 26 and 30, by the clinching of the rim portions of the shell members.

The tubular inlet member 18 is made from a flat sheet metal blank that is rolled into a tube, but with its adjacent edges very slightly spaced apart, as at 34, so as to provide an open seam which accommodates expansion and contraction with changing temperature. An imperforate rear end portion 35 of the tubular member projects behind the rear end wall 26 of the shell for connection to an engine exhaust pipe or exhaust duct. A rearwardly opening axially elongated slot 36 in this rear portion of the tube, diametrically opposite the seam 34, enables the tubular member to be snugly slid over the outer end portion of an exhaust pipe 13 and secured to it with a circumferential clamp 39.

The portion of the tubular member that is within the shell is perforated with numerous small holes 25 through which incoming exhaust gases enter the rear compartment 22 with a disrupted flow and in divergent directions. The front end of the tubular member is blocked by the partition member 19, so that the incoming gases are compelled to leave the tubular member through the perforations 25. More specifically, the partition member comprises a plate-like main stamping 19' and a hat-shaped stamping 38 which is seated in a closely fitting hole in the main stamping and in which the front end portion of the tubular member is snugly received. The hat-shaped stamping defines a shallow, rearwardly opening well that is coaxial with the port 27 in the rear end wall 26 through which the tubular member extends. A weldment 62 around the port 27 secures the tubular member to the shell and cooperates with the hat-shaped stamping to hold the tubular member in rigid relation to the shell and the partition member 19. The rim of the hat-shaped stamping is spot welded to the main stamping of the partition member, so that those two stampings are for practical purposes integral with one another.

The gases issuing from the tubular member 18 enter the rear compartment 22 near one end thereof and are thence compelled to flow through substantially the full length of the muffler in the rear compartment. The rear compartment thus comprises one of three elongated passages in the muffler through which exhaust gases flow lengthwise and successively in passing from the inlet port 27 to the outlet port 31. The other two elongated passages are in front of the partition member 19, as explained below.

However, the rear compartment does not constitute an uninterrupted passage but is instead divided into several communicated chambers by the baffling and reinforcing means 23, which also serves to reinforce the rear end wall 26 of the shell. As shown, the baffling and reinforcing means 23 is a unitary, generally U-shaped stamping that comprises a pair of rectangular divider elements 42 and 44 which constitute the legs of the U and extend transversely across the rear compartment 22 to divide it into three chambers 40, 41 and 42. The bight portion of the U-shaped stamping is a flat, rectangular connecting portion 45 that is joined to the two divider elements at their rear edges and flatwise overlies the inner surface of the rear end wall 26 of the shell. Other connecting portions 46 and 47 on the U-shaped stamping comprise flange-like laterally outward projections on the front edges of the divider elements 43 and 44, which flatwise overlie rear surface portions of the partition member 19.

the flange-like connecting portions 46 and 47 are spot welded to the partition member, as indicated at 48. However, the connecting portion 45, which flatwise overlies the rear wall 26 of the shell, need not be welded to that shell wall inasmuch as it is clamping secured thereto by bolts 61 that are threaded into it through the shell wall when the muffler is fastened to its mounting bracket 14. The connecting portion 45 thus serves to provide for attachment of the muffler to its mounting bracket and to reinforce the shell at it zone of attachment, in addition to performing other functions that will appear as the description proceeds.

The reinforcement of the rear shell wall 26 by the baffling and reinforcing means 23 contributes to exhaust silencing, inasmuch as the rear shell wall has a rather large area and, if not so reinforced, could be set into vibration by exhaust gas pulses in the muffler, thus acting as a diaphragm that propagated exhaust noises. This diaphragm effect could be reduced by increasing the thickness of the end walls of the shell, but there is a definite limit to the feasible thickness of those end walls, imposed not only by the cost of the shell material but also by the formation of the shell members 15 and 16 as relatively deeply drawn stampings.

To stiffen the partition member 19, so that it can cooperate with the U-shaped stamping 23 in damping vibration of the rear shell wall, the partition member has a series of embossed transverse ribs 49 that are laterally spaced from one another at intervals along its length, each extending across nearly its entire width. The projecting surfaces of these ribs are at the rear face of the partition member, so that the ribs also serve to produce a certain amount of turbulence in the exhaust gases flowing lengthwise through the rear compartment or longitudinal passage 22.

It should be observed that in addition to its baffling and reinforcing functions, the U-shaped stamping 23 also server to abstract heat from the exhaust gases passing through the muffler and transfer it to rear end wall 26 of the shell, from which such heat is in turn removed by the stream of cooling air flowing across the muffler.

It has already been pointed out that the exhaust gas passing through the perforations 37 in the tubular inlet member issues into the chamber 40 of the rear compartment in dispersed, divergent streams. However, the divider element 43 that separates the chamber 40 from its adjacent middle chamber 41 has in it only a few relatively large holes 50 (as shown, there are two such holes), and the gases are thus, in effect, reassembled into a few large streams in passing from the chamber 40 to the chamber 41. But the next divider element 44 along the course of gas flow is perforated with numerous small holes 51, by which the gas is again dispersed into numerous small streams in flowing from the middle chamber 41 into the end chamber 42. Such alternate breaking up and reassembling of the gas flow has been found to be very effective in cushioning the gas pulses that account for most of the exhaust noise of an engine. The provision of large holes through which gas flows from one compartment to the next is further advantageous in that a muffler baffle having a large hole does not tend to deteriorate as rapidly as one having small perforations and is less susceptible to fouling by carbon deposits.

A small portion of the gas in the middle chamber 41 is permitted to escape directly therefrom into the front compartment 21 through a line of small holes 52 in the partition member 19, located inwardly adjacent to the divider element 44. However, most of the gas in that middle chamber is compelled to take a longer path to the front compartment, through the perforations 51 in the divider element 44 and into the end chamber 42, and thence into the front compartment through two pairs of relatively large holes 53 in the partition member 19. Those pairs of holes are located near the opposite longitudinal edges of the partition member.

Dividing the gases in this manner, so that different parts of them take paths of different lengths through the muffler, further contributes to cushioning of the exhaust gas pulses, inasmuch as the gases are thus caused to issue from the muffler outlet at a more nearly constant rate than they enter its inlet.

The pan-like baffle member 24 divides the front compartment 21 into inner and outer elongated passages 54 and 55 through which the gas successively flows lengthwise in passing from the holes 52 and 53 to the outlet port 31. The member 24 has an out-turned rim portion 56 which flatwise overlies the inner surface of the front end wall 30 of the shell, around marginal portions thereof, and which is spot welded to the front shell wall at spaced points around it. Its bottom wall has a large, flat central portion 57, which is in spaced, parallel relation to both the front shell wall 30 and the partition member 19, and has obliquely forwardly extending end portions 58 and 59. The end portion 58 that is remote from the holes 53 in the partition member is perforated with numerous small holes 60 to provide for communication between the elongated passages 54 and 55. The outlet port 31 in the front end wall, which also comprises numerous small holes, is near the end of the muffler that is remote from the perforations 60. Hence gas entering the inner elongated passage 54 through the holes 53 in the partition member is compelled to flow along most of the length of the muffler to the perforations 60, and thence again along a substantial part of the length of the muffler to the outlet port 31. In the course of such flow through the relatively shallow passages 54 and 55 the gas makes good contact with the surfaces that define those passages, so as to transfer heat to those surfaces and thus ultimately to the stream of cooling air flowing across the exterior of the muffler.

As shown, the central portion 57 of the bottom wall of the pan-like baffle member is hour-glass-shaped, but its rim portion 56 is substantially rectangular in outline. The wall portion 57 could of course be generally rectangular, but by reason of its illustrated hour-glass shape the rim 56 is substantially wide and therefore contributes substantially greater stiffness to the front end wall 30 of the shell and is effective in transferring heat thereto.

The gas issuing from the outlet port 31 is directed in any desired direction parallel to the front end wall by means of a deflector 63 mounted over that end wall.

The deflector has a dome-like central portion 64 and a uniplanar flange or rim 65 that flatwise overlies the front shell wall. A cutout 66, at one side of the dome 64, provides the outlet through which gas finally leaves the muffler. A series of holes 67 in the rim, at regular circumferential intervals around it, enables the deflector to be secured to the shell, in any of a number of different angular positions, by means of two or more sheet metal screws 69 passing through a diametrically opposite selected pair of said holes and into holes 70 in the shell at opposite sides of the outlet port.

From the foregoing description taken with the accompanying drawings it will be apparent that this invention provides a muffler for small engines which is relatively compact and low in cost and demands no substantial sacrifice of engine efficiency, but which nevertheless affords sufficient silencing of exhaust noise to enable enginepowered machines to comply with stringent noise abatement legislation.

Those skilled in the art will appreciate that the invention can be embodied in forms other than as herein disclosed for purposes of illustration.

The invention is defined by the following claims:
We claim:

1. In combination with an air cooled single-cylinder internal combustion engine having a blower shroud which embraces a substantial portion of the engine cylinder and which guides cooling air across the cylinder from a fly-wheel blower at one side of the cylinder to an outlet in the blower shroud at the opposite side of the cylinder:
   A. an air outlet duct communicated with the outlet in the blower shroud and extending away from the same;
   B. a muffler having
      1 an elongated shell with substantially parallel front and rear shell walls that extend lengthwise of the shell,
      2 an exhaust gas inlet port in the rear of the shell, near one end thereof, communicated by means of an exhaust gas duct with an exhaust outlet of the engine, and
      3 an exhaust outlet port in the front of the shell, near the opposite end thereof;
   C. means mounting said muffler in the air outlet duct so that the muffler can be swept by the stream of cooling air that has been blown across the engine cylinder;
   D. means defining front and rear partition walls in the interior of the muffler shell that are parallel to said front and rear shell walls and are spaced from them and from one another, to divide the interior of the muffler into three gas passages, each of which extends along a substantial portion of the length of the muffler, each said partition wall being apertured near the end of the shell remote from its adjacent port in the shell so that gas is constrained to flow lengthwise in succession through said passages in passing from said inlet port to said outlet port;
   E. a substantially U-shaped partition member confined between the rear shell wall and the rear partition wall,
      1 the legs of said U-shaped member comprising apertured dividers which extend across the rear gas passage and divide it into three cmpartments that are communicated with one another through the apertures in said dividers, and
      2 the bight portions of said U-shaped member flatwise overlying the inner surface of the rear shell wall, said partition member thus serving both to disrupt gas flow through the rear gas passage and to transfer heat to said rear shell wall from the rear partition wall; and
   F. the front partition wall comprising a pan-like member which has a substantially wide rim portion that flatwise overlies the inner surface of the front shell wall to reinforce the same and transfer heat thereto.

2. A muffler for an internal combustion engine, comprising:
   A. front and rear complementary shell members secured together to define an elongated hollow shell, each shell member having
      1 an elongated end wall substantially parallel to the end wall of the other shell member and spaced therefrom,
      2 a side wall extending all around its end wall and projecting therefrom towards the other shell member,
      3 a rim portion on the side wall opposing the rim portion on the other shell member and secured to the same, and
      4 a port through which exhaust gas can flow between the interior and the exterior of the shell, the port in the rear shell member being near one longitudinal extremity thereof;
   B. an elongated partition wall member having edge portions clamping confined between the rim portions of the shell members and extending across the interior of the shell in spaced, parallel relation to said end walls, to divide the interior of the shell into front and rear compartments, said partition wall member being apertured near its longitudinal extremity remote from the port in the rear shell member to communicate said copartments with one another; and
   C. baffling and reinforcing means in the rear compartment comprising
      1 a plurality of substantially flat, parallel and spaced apart divider elements extendng substantially normal to the partition member and transversely to the length of the shell, dividing the rear compartment into a plurality of chambers, said divider elements being apertured to provide for communication between said chambers, and
      2 connecting elements on the front and rear edges of the divider elements, said connecting elements being normal to the divider elements and being flatwise secured, respectively, to the partition wall member and to the end wall of the rear shell member, to hold the divider elements in place and to afford reinforcement and rigidity to said partition wall member and said end wall.

3. The muffler of claim 2, further characterized by:
   D. a tubular inlet member extending through said port in the rear shell member, said tubular member having a portion which is external to the shell and to which an engine exhaust duct is connectable and having another portion inside the shell which is closed at its inner end and in which there are numerous small apertures.

4. The muffler of claim 3 further characterized by:
   E. said baffling and reinforcing means comprising a unitary substantially U-shaped member, the legs of which comprise a pair of divider elements and the bight portion of which comprises one of said connecting elements;

F. the partition wall member and the divider element adjacent said tubular inlet member each being apertured with substantially large and few apertures; and G. the other divider element being apertured with numerous small apertures, so that in moving from the tubular inlet member to the front compartment gases are alternately broken into dispersed flows and reassembled into larger streams to thus effect cushioning of gas pulses.

5. The muffler of claim 3 wherein said port in the rear shell member is in said end wall thereof, and wherein the inner end of said tubular member is closed by the partition wall member.

6. The muffler of claim 2 wherein the port in the front shell member is near the longitudinal extremity of the shell that is remote from the port in the rear shell member, and wherein said port in the front shell member is in the end wall thereof, further characterized by:

D. a pan-like member which divides the front compartment into two passages which are elongated lengthwise of the shell and which are communicated with one another near the longitudinal extremity of the shell remote from said port in the front shell member, said pan-like member having 1 a rim portion which flatwise overlies the inner surface of the end wall of the frongt shell member around marginal portions thereof, and 2 an offset partition wall portion which is substantially parallel to and spaced from both the partition wall member and the end wall of the front shell member.

7. In combination with an air-cooled single-cylinder internal combustion engine having a shroud which embraces a substantial portion of the engine cylinder and guides cooling air rearwardly across the cylinder from a flywheel blower at the front of the cylinder to an outlet in the shroud at the rear of the cylinder:

A. an air outlet duct communicated with the air outlet in the shroud and extendng away from the cylinder, said air outlet duct having a width at least equal to the width of the shroud;

B. a muffler having an elongated shell with substantially parallel front and rear walls that extend lengthwise of the shell;

C. a rigid bracket connected between the engine cylinder and the muffler, by which the muffler is supported in the air outlet duct, with the length of the muffler extending across the width of the air outlet duct so that the muffler is swept and cooled by cooling air that has been blown across the engine cylinder, said bracket being connected with the rear wall of the shell, at a zone near the middle thereof;

D. an exhaust pipe connecting an exhaust outlet in the engine cylinder with an exhaust inlet port in said muffler shell, in the rear wall of the shell and near one end of said rear wall, said exhaust pipe being within the air outlet duct;

E. means in the shell providing an intermediate wall which is spaced from and parallel to said front and rear walls and which divides the interior of the shell into communicated front and rear compartments; and F. a U-shaped member in said rear compartment 1 having a flat bight portion which flatwise overlies the inner surface of the rear wall at said zone, to reinforce the rear wall at its connection with the bracket, and 2 the legs of said U-shaped member comprising apertured dividers which extend across the rear compartment from said rear wall to said intermediate wall to divide the rear compartment into communicated chambers, said legs being connected with said intermediate wall at their inner ends to conduct heat therefrom to the rear wall.

8. The combination of claim 7 wherein the exhaust pipe projects from one side of the cylinder, behind the shroud, and wherein the air outlet duct is substantially wider than the cylinder and projects beyond the cylinder at said side thereof to encompass the exhaust pipe.

* * * * *